United States Patent [19]

Verlijsdonk et al.

[11] Patent Number: 4,926,091
[45] Date of Patent: May 15, 1990

[54] LUMINESCENT TERBIUM-ACTIVATED BORATE, LUMINESCENT SCREEN PROVIDED WITH SUCH A BORATE AND LOW-PRESSURE MERCURY VAPOR DISCHARGE LAMP PROVIDED WITH SUCH A SCREEN

[75] Inventors: Johannus G. Verlijsdonk; Robert J. Pet; Bruno M. J. Smets, all of Eindhoven, Netherlands

[73] Assignee: U.S. Philips Corporation, New York, N.Y.

[21] Appl. No.: 403,219

[22] Filed: Sep. 5, 1989

[30] Foreign Application Priority Data

Sep. 7, 1988 [NL] Netherlands .................. 8802203

[51] Int. Cl.$^5$ .............................................. C09K 11/78
[52] U.S. Cl. ............................. 313/486; 252/301.4 R; 428/690
[58] Field of Search .............. 252/301.4 R; 313/486; 428/690

[56] References Cited

U.S. PATENT DOCUMENTS

| | | |
|---|---|---|
| 3,423,325 | 1/1969 | Wanmaker et al. ........ 252/301.4 R |
| 4,202,794 | 5/1980 | Lehmann .................... 252/301.4 R |
| 4,233,538 | 11/1980 | van de Spijker et al. ... 252/301.4 R |
| 4,403,171 | 9/1983 | Nakano et al. ............. 252/301.4 R |
| 4,422,007 | 12/1983 | Fovassier et al. .......... 252/301.4 R |
| 4,810,416 | 3/1989 | Hase et al. ................. 252/301.4 R |

FOREIGN PATENT DOCUMENTS

| | | |
|---|---|---|
| 2410134 | 9/1974 | Fed. Rep. of Germany ... 252/301.4 R |
| 54-62989 | 5/1979 | Japan ........................... 252/301.4 R |

Primary Examiner—Jack Cooper
Attorney, Agent, or Firm—John C. Fox

[57] ABSTRACT

Luminescent terbium-activated alkaline earth metal rare earth metal borate having a monoclinic crystal structure and being defined by the formula $M_3Ln_{1-x}Tb_x(BO_3)_3$ in which M is at least one of the elements Ba, Sr and Ca of which up to 34 mol % may be replaced by Mg, in which Ln is at least one of the elements La, Gd, Y and Sc and in which $0.005 \leq x \leq 1$.

7 Claims, 1 Drawing Sheet

LUMINESCENT TERBIUM-ACTIVATED BORATE, LUMINESCENT SCREEN PROVIDED WITH SUCH A BORATE AND LOW-PRESSURE MERCURY VAPOR DISCHARGE LAMP PROVIDED WITH SUCH A SCREEN

BACKGROUND OF THE INVENTION

The invention relates to a luminescent terbium-activated alkaline earth metal rare earth metal borate. The invention also relates to a luminescent screen provided with such a borate and to a low-pressure mercury vapour discharge lamp provided with such a screen.

Luminescent alkaline earth metal rare earth metal borates activated by $Tb^{3+}$ whose fundamental lattice is defined by the general formula $M_3Ln_2(BO_3)_4$ are known from British Patent Specification 1,453,991 (PHN 6798). In this formula M represents an alkaline earth metal and Ln represents a rare earth metal. All compounds defined by this general formula have an orthorhombic crystal structure. Upon excitation of such a luminescent borate by electrons, X-ray radiation or ultraviolet radiation, particularly short-wave ultraviolet radiation, the spectral distribution of the radiation emitted by the borate is that of the characteristic $Tb^{3+}$ emission having a very steep, narrow peak (half-value width approximately 10 nm) at approximately 543 nm, with a number of side emissions.

OBJECT AND SUMMARY OF THE INVENTION

A drawback of these known luminescent borates is their relatively low quantum efficiency and UV absorption upon excitation by ultraviolet radiation having a wavelength of 254 nm. The excitation maximum of these borates is at approximately 230 nm. For use in a low-pressure mercury vapour discharge lamp it is, however, desirable that the excitation maximum is at approximately 254 nm because the mercury resonance radiation is located at that wavelength.

The object of the invention is to provide novel luminescent borates which are particularly suitable for use in low-pressure mercury vapour discharge lamps and which are more efficient than the borates known from British Patent Specification 1,453,991.

According to the invention a luminescent terbium-activated alkaline earth metal rare earth metal borate of the type described in the opening paragraph is characterized in that the borate has a monoclinic crystal structure and is defined by the formula $M_3Ln_{1-x}Tb_x(BO_3)_3$ in which M represents at least one of the elements Ba, Sr and Ca of which up to 34 mol % may be replaced by Mg, in which Ln represents at least one of the elements La, Gd, Y and Sc and in which $0.005 \leq x \leq 1$.

The excitation maximum of these borates is located at or very near 254 nm. Furthermore these borates are found to have a high quantum efficiency under 254 nm radiation and a high absorption of this exciting radiation.

The luminescent borates according to the invention have a monoclinic crystal structure which is completely different from the structure of the above-mentioned known borates, which are orthorhombic. The desired monoclinic structure can be obtained if Ba, Sr and/or Ca are used for the element denoted M and if the elements La, Gd, Y and/or Sc are chosen for Ln. A limited quantity of the elements denoted M (a maximum of 34 mol %) may be replaced by Mg while maintaining the crystal structure. Larger quantities of Mg give rise to the formation of too many side phases.

The terbium content x is chosen to be within the above-mentioned limits. If x is chosen to be smaller than 0.005, materials having a too low absorption of the exciting radiation are obtained. The maximum value of x is 1, whereby Ln is completely replaced by terbium.

It is to be noted that an alkaline earth metal rare earth metal borate defined by the formula $Ca_3Yb(BO_3)_3$ is known from the Article "Synthese und kristallographische Daten von $Yb_2Ca_3(BO_3)_4$" (Zeitschrift für Kristallographie, Vol. 146, pages 53–60 (1977), Akademische Verlagsgesellschaft, Wiesbaden). The Article does not state anything about the crystal structure of this compound designated as "X phase", nor about any possibilities of activating this borate for obtaining a luminescent material.

Furthermore it is to be noted that during experiments a terbium-activated borate defined by the formula $Ba_3Y(BO_3)_3$ was realised whose fundamental lattice has a hexagonal crystal structure. The starting mixture used was a mixture of $BaCO_3$, $Y_2O_3$, $H_3BO_3$ and $Tb_4O_7$ which was heated three times for 1 hour at a temperature of 900° C. in a weakly reducing atmosphere. This luminescent borate having a hexagonal crystal structure has a low UV absorption upon excitation by 254 nm radiation and is therefore less suitable for use in low-pressure mercury vapour discharge lamps. On the other hand the luminescent borates according to the invention which, as will be explained hereinafter, are prepared by means of a solid-state reaction at a higher temperature, have a monoclinic crystal structure and a high UV absorption under 254 nm radiation.

A preferred embodiment of a luminescent borate according to the invention is characterized in that $0.05 \leq x \leq 0.50$.

In addition to the fact that high UV absorptions and high quantum efficiencies under 254 nm radiation are realised with such relatively low terbium concentrations, the use of low terbium concentrations is economically advantageous in view of the relatively high cost price of terbium.

Preferably, La is chosen for the element denoted Ln because La is economically the most advantageous element from the group denoted Ln, apart from the fact that very efficient luminescent materials are obtained.

The luminescent borates according to the invention can be obtained by means of a solid-state reaction at a high temperature. The starting mixture is a mixture of the composite oxides or of compounds yielding these oxides when the temperature is raised (for example, carbonates, boric acid as a source for boron trioxide etc.). In the starting mixture slight deviations (up to 10 mol %) of the stoichiometry of the compound to be formed are admissible. Generally a small excess of one or more of the composite elements may promote the reaction. Particularly the use of an excess of boron trioxide or boric acid is found to be advantageous for the preparation. The starting mixture is heated once or several times for some time at a temperature between 1100° C. and the melting point. It is advantageous to perform the heat treatment in several steps. Firstly, the mixture is then preheated at a relatively low temperature, for example 700° C., whereafter one or more heat treatments at a higher temperature, for example 1200°–1250° C., are carried out in a weakly reducing atmosphere.

Embodiments of luminescent borates according to the invention, suitable for use in low-pressure mercury vapour discharge lamps will now be described in greater detail with reference to a drawing and a number of examples of preparation.

DESCRIPTION OF THE PREFERRED EMBODIMENTS

Figure 1:
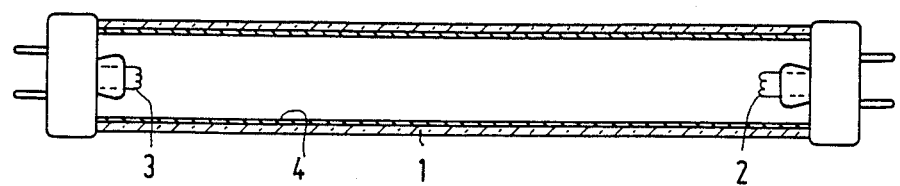
FIG. 1 shows a low-pressure mercury vapour discharge lamp in a longitudinal section, which lamp has a luminescent screen comprising a $Tb^{3+}$ activated borate according to the invention.

The low-pressure mercury vapour discharge lamp shown in FIG. 1 has a tubular glass wall 1. Electrodes 2 and 3, between which the discharge is maintained during operation, are arranged within the lamp at its ends. The lamp comprises a small quantity of mercury and a rare gas as starter gas. The wall 1 is used as a support for a luminescent layer 4 comprising a luminescent $Tb^{3+}$ activated borate according to the invention. The wall 1 and the luminescent layer 4 together constitute a luminescent screen. The layer 4 may be provided in the conventional manner on the wall 1, for example, by means of a suspension comprising the luminescent material.

EXAMPLE 1

A mixture was made of
6.394 g of $BaCO_3$
2.392 g of $SrCO_3$
1.795 g of $La_2O_3$
0.969 g of $Tb_4O_7$
3.155 g of $H_3BO_3$ (5 mol % excess)

This mixture was heated in air in a furnace for 1 hour at 700° C. After cooling down the firing product was ground and subsequently heated twice in the furnace, each time for 1 hour at 1250° C. in a weakly reducing atmosphere (a mixture of $N_2$ and several vol.% of $H_2$). After cooling down the product was ground. A luminescent Tb-activated borate defined by the formula $Ba_2SrLa_{0.68}Tb_{0.32}(BO_3)_3$ was thus obtained. This compound had a monoclinic crystal structure with the following measured values of the lattice parameters:
a = 7.37 Å
b = 12.94 Å
c = 4.90 Å
$\angle \beta = 99.8°$ Under 254 nm excitation radiation the quantum efficiency was 90% and the UV absorption was 94%.

EXAMPLES 2 TO 24

In a corresponding manner as described in example 1, a number of $Tb^{3+}$ activated borates according to the invention was prepared. The Table below states for these borates the formula, the quantum efficiency Q (in %) and the UV absorption A (in %) under 254 nm excitation radiation. All these compounds also have a monoclinic crystal structure.

| No. | Formula | Q(%) | A(%) |
|---|---|---|---|
| 2 | $Ba_3Gd_{0.84}Tb_{0.16}(BO_3)_3$ | 84 | 87 |
| 3 | $Ba_3Y_{0.80}Tb_{0.20}(BO_3)_3$ | 83 | 86 |
| 4 | $Ba_2SrLa_{0.98}Tb_{0.02}(BO_3)_3$ | 85 | 71 |
| 5 | $Ba_2SrLa_{0.84}Tb_{0.16}(BO_3)_3$ | 90 | 90 |
| 6 | $Ba_2SrGd_{0.68}Tb_{0.32}(BO_3)_3$ | 82 | 91 |
| 7 | $Ba_2SrTb(BO_3)_3$ | 68 | 93 |
| 8 | $Ba_2SrY_{0.90}Tb_{0.10}(BO_3)_3$ | 88 | 73 |
| 9 | $Ba_2SrY_{0.68}Tb_{0.32}(BO_3)_3$ | 84 | 90 |
| 10 | $Ba_2SrSc_{0.68}Tb_{0.32}(BO_3)_3$ | 79 | 79 |
| 11 | $Ba_2CaLa_{0.68}Tb_{0.32}(BO_3)_3$ | 88 | 84 |
| 12 | $Ba_2CaGd_{0.68}Tb_{0.32}(BO_3)_3$ | 88 | 80 |
| 13 | $Ba_2CaY_{0.68}Tb_{0.32}(BO_3)_3$ | 80 | 72 |
| 14 | $Ba_{0.75}Sr_{2.25}Y_{0.09}Tb_{0.10}(BO_3)_3$ | 77 | 66 |
| 15 | $BaSrCaLa_{0.24}Gd_{0.24}Y_{0.24}Tb_{0.28}(BO_3)_3$ | 78 | 84 |
| 16 | $Sr_3La_{0.84}Tb_{0.16}(BO_3)_3$ | 92 | 80 |
| 17 | $Sr_3Gd_{0.84}Tb_{0.16}(BO_3)_3$ | 89 | 83 |
| 18 | $Sr_3Y_{0.80}Tb_{0.20}(BO_3)_3$ | 83 | 76 |
| 19 | $Sr_2CaLa_{0.68}Tb_{0.32}(BO_3)_3$ | 76 | 75 |
| 20 | $BaSrMgGd_{0.68}Tb_{0.32}(BO_3)_3$ | 82 | 65 |
| 21 | $Ca_2SrY_{0.68}Tb_{0.32}(BO_3)_3$ | 89 | 71 |
| 22 | $SrCaMgLa_{0.68}Tb_{0.32}(BO_3)_3$ | 71 | 64 |
| 23 | $Ca_2MgY_{0.68}Tb_{0.32}(BO_3)_3$ | 83 | 59 |
| 24 | $Ca_2BaLa_{0.68}Tb_{0.32}(BO_3)_3$ | 82 | 80 |

Upon excitation by short-wave ultraviolet radiation (predominantly 254 nm) these materials exhibited the characteristic Tb emission.

Figure 2:
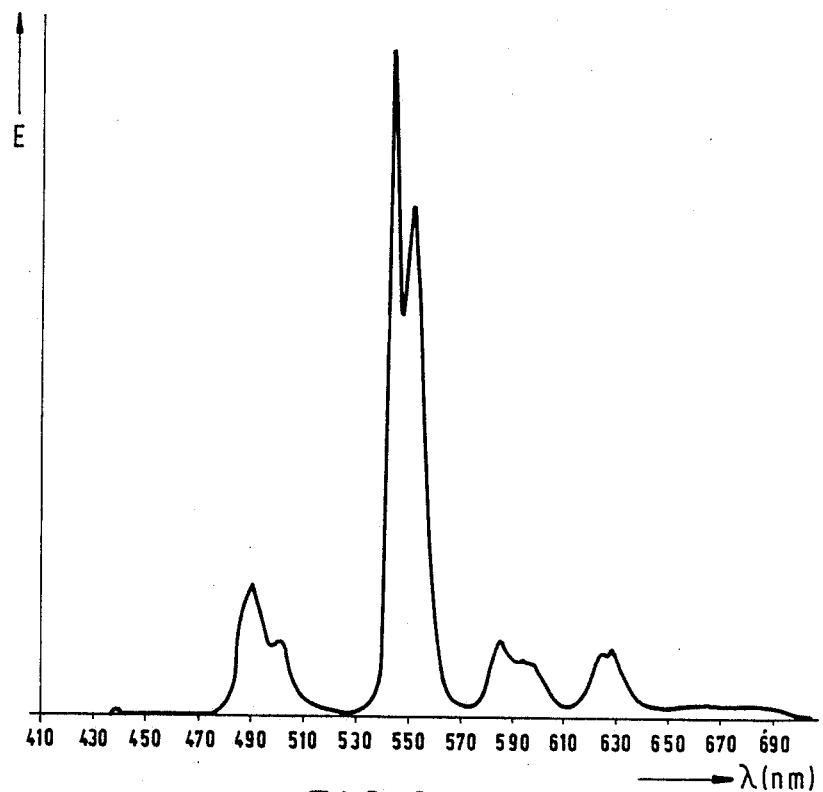
FIG. 2 shows the spectral energy distribution of the radiation emitted by a $Tb^{3+}$ activated borate according to the invention.

FIG. 2 shows the emission spectrum of the borate of example 1 ($Ba_2SrLa_{0.68}Tb_{0.32}(BO_3)_3$). In this Figure the wavelength λ (in nm) is plotted on the horizontal axis and the emitted radiation energy E (in arbitrary units) is plotted on the vertical axis.

We claim:

1. A luminescent terbium-activated alkaline earth metal rare earth metal borate, characterized in that the borate has a monoclinic crystal structure and is defined by the formula $$M_3Ln_{1-x}Tb_x(BO_3)_3$$

in which M represents at least one of the elements Ba, Sr and Ca of which up to 34 mol % is replaceable by Mg, in which Ln is at least one of the elements La, Gd, Y and Sc and in which $0.005 \leq x \leq 1$.

2. A luminescent borate as claimed in claim 1, characterized in that $0.05 \leq x \leq 0.50$.

3. A luminescent borate as claimed in claim 1 or 2, characterized in that the element denoted by Ln is La.

4. A luminescent screen comprising a support having provided thereon a luminescent borate as claimed in claim 3.

5. A low-pressure mercury vapor discharge lamp comprising a luminescent screen as claimed in claim 4.

6. A luminescent screen comprising a support having provided thereon a luminescent borate as claimed in any one of claims 1, and 2.

7. A low-pressure mercury vapour discharge lamp, comprising a luminescent screen as claimed in claim 6.

* * * * *